March 19, 1957 C. W. CARRICK 2,785,622
VENTILATOR CONDUIT AND SHUTTER ASSEMBLY
Filed Oct. 28, 1953
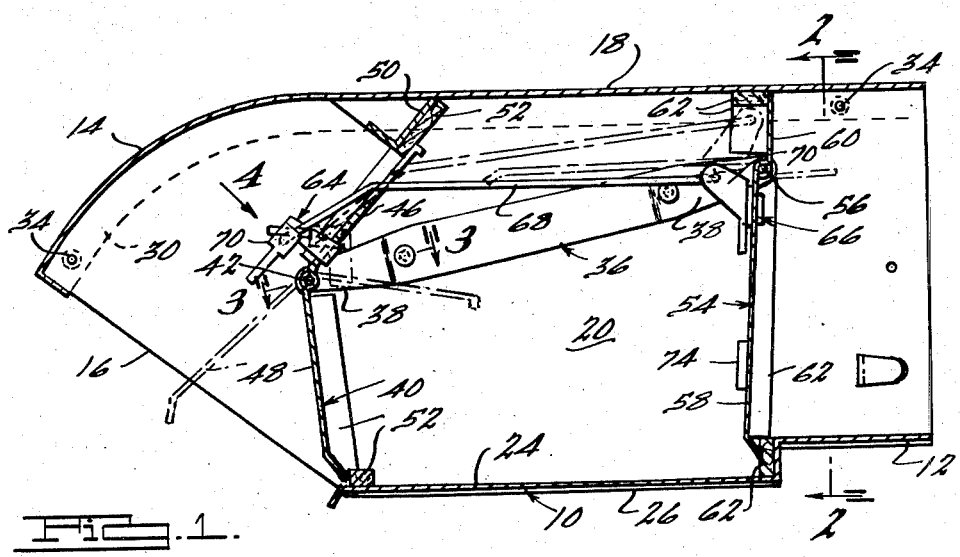
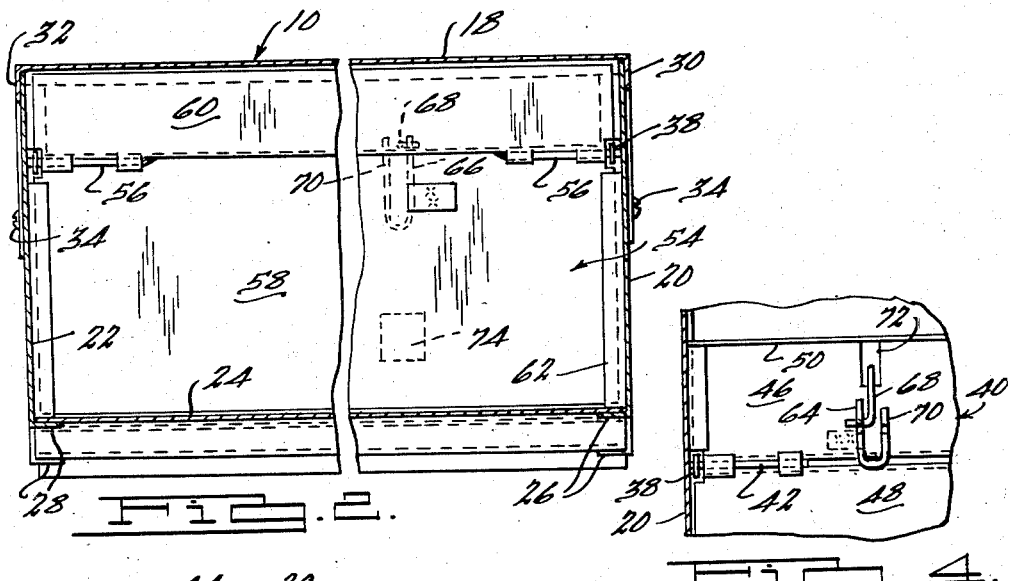
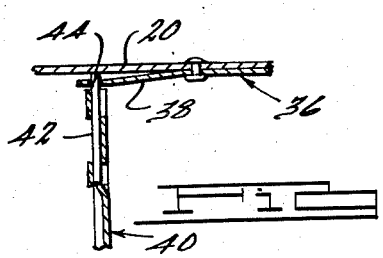
INVENTOR.
Charles W. Carrick
BY
Harness, Dickey & Pierce
ATTORNEYS

United States Patent Office 2,785,622
Patented Mar. 19, 1957

2,785,622

VENTILATOR CONDUIT AND SHUTTER ASSEMBLY

Charles W. Carrick, Royal Oak, Mich., assignor to Ventrola Manufacturing Company, a corporation of Michigan Application October 28, 1953, Serial No. 388,712

10 Claims. (Cl. 98—116)

The present invention relates to an improved ventilator conduit and shutter assembly. This ventilator conduit and shutter assembly is particularly useful for and accordingly is herein described in connection with the use thereof, as a part of an exhaust fan system of the type frequently used in home kitchens.

In previously known ventilator systems one serious objection to the shutters employed is that frequently the shutters flap between their open and closed positions when the ventilator system is not in use, because of changes in the air pressure at the side of the house at which they are located. This results in a very undesirable banging or rattling of the shutter and numerous attempts have been made to eliminate this disadvantage. It has been attempted to overcome this disadvantage by locating the shutter well within the building and adjacent the fan in instances where the fan is located remote from the outside wall, but this has been unsatisfactory because of the cool column of air between the shutter and the outside wall and the resulting sweating on the wall or ceiling. Other attempts to eliminate this flapping have included for example, the provision of a solenoid operated latch for holding the shutter in its closed position or the use of an electric motor drive for opening and closing the shutter. Constructions of this type are relatively expensive and therefore not practicable.

It is an object of the present invention to provide an improved ventilator conduit and shutter assembly in which the shutter assembly is automatically opened upon operation of the fan and in which, upon termination of the operation of the fan the shutter is automatically locked in its closed position.

It is also an object of the present invention to provide an improved ventilator and conduit shutter assembly which is simple in design, economical of manufacture and reliable and efficient in operation.

Other and more detailed objects of the invention will be appreciated from a consideration of the following specification, the appended claims and the accompanying drawing wherein:

Figure 1 is a longitudinal sectional view of a ventilator conduit and shutter assembly embodying the present invention;

Figure 2 is a sectional view of the structure illustrated in Figure 1, taken substantially along the line 2—2 thereof;

Figure 3 is a fragmentary sectional view of the structure illustrated in Figure 1, taken substantially along the line 3—3 thereof; and Figure 4 is a fragmentary sectional view of a portion of the structure illustrated in Figure 1 looking in the direction of the arrow 4 thereof.

Referring to the drawing, the ventilator conduit and shutter assembly of the present invention includes a conduit 10 of generally rectangular cross section as seen in Figure 2, which is provided with a reduced inner end portion 12 for connection thereof to an adjacent conduit section, and the outer end portion of which is formed as illustrated in Figure 1 to provide a shield 14 extending over and protecting the opening 16 at the outer end of the conduit section to prevent rain, snow and the like from entering the conduit 10. In the embodiment illustrated, the conduit section 10 is formed of a top 18, two similar sides 20 and 22, and a bottom 24. These four parts are formed of sheet metal coated with a suitable paint, enamel, or other protective material. The sides 20 and 22 have inwardly turned flanges 26 and 28 supporting and spot welded to the bottom 24. The top 18 has depending flanges 30 and 32 extending along its opposite sides and is removably secured in position by screws 34 extending through these flanges 30 and 32 and through the upper marginal portion of the sides 20 and 22.

A pair of shutter supporting strips 36 are riveted to the sides 20 and 22 at the inner sides thereof and are formed of a resilient weather resistant material such as a suitable bronze alloy. The opposite end portions 38 of the strips 36 are deformed through a slight angle so that they diverge inwardly from the side member upon which they are supported. An outer shutter 40 is provided with fixed aligned pivot pins 42 which are journaled in aligned apertures 44 in the outer end portions of the supporting strips 36. Considering the shutter 40 in its closed position illustrated in full lines in Figure 1, the portion 46 above the pivot pins 42 is disposed at an angle to the portion 48 below the pivot pins 42 so that when the shutter 40 is in its open position the lower shutter portion 48 extends generally at right angles to the plane of the opening 16 at the outer end of the conduit 10 and the upper portion 46 of the shutter 40 extends generally parallel to bottom 24 of the conduit. A baffle 50 extends transversely of the conduit adjacent the top 18 and is disposed to seal the space between the upper edge of the shutter 40 and the top 18, when the shutter 40 is in its closed position. Strips 52 of felt or other suitable sealing material are mounted on the bottom 24, the sides 20 and 22 and the baffle 50 for engaging the edge portions of the shutter when it is in closed position.

A second shutter 54 is disposed within the conduit 10 adjacent the reduced inner end 12 and also carries a pair of aligned pivot pins 56 which are journalled in the aligned apertures in the rear end portions of the supporting strips 36. The inner shutter 54 differs from the above described outer shutter 40 in that it is substantially flat and in that, as seen in its closed position, the lower portion 58 is very much larger than the upper portion 60 so that air pressure acting on the inner side of the shutter 54 produces a substantial pressure differential acting to pivot the shutter 54 in a clockwise direction. The spaces at the edges of the shutter 54, when in closed position, are closed by strips 62 of felt or other suitable sealing material.

The shutters 40 and 54 have lever arms 64 and 66 welded or otherwise suitably secured thereto and extending outwardly from the shutters when they are disposed in their closed positions. Each of the lever arms 64 and 66 is provided with an aperture receiving a laterally turned end portion of an interconnecting link 68. Each of the lever arms also has a reversely turned portion 70 disposed to prevent movement of the link 68 so as to withdraw the laterally turned end portion thereof from the aperture in the lever arm. It will be appreciated of course that in the above described consrtuction the link 68 extends through the outer shutter 40, the upper portion 46 thereof being provided with a slot 72.

The lever arms 64 and 66 and the link 68 are so constructed and arranged that when both of the shutters 40 and 54 are in their closed positions the pivotal connection of the link 68 to the lever arm 66 of the shutter 54 is so disposed that the outer shutter 40 is locked against pivotal movement, and so constructed and arranged that when the shutter 54 is moved in an opening direction from its closed position the link 68 is moved so as to move the shutter 40 in an opening direction. More specifically, as the shutters move toward their closed position, the pivotal connection of link 68 to the arm 66, moves toward a line between the pivotal connection of the link 68 to the arm 64 and the pivot axis of the pivot pins 56. As the shutters reach the closed position the pivotal connection of link 68 to arm 66 moves onto or slightly across the just mentioned line. It will be appreciated that when the pivotal connection of the link 68 to the arm 66 has thus moved onto or across the above mentioned line, any force transmitted to the arm 66 from the link 68 as the result of any attempt to pivot the shutter 40 in an opening direction, will not produce any moment tending to pivot the shutter 54 in an opening direction since the effective lever arm of any such force will be either zero or negative. In the preferred embodiment illustrated the pivotal connection of the link 68 to the arm 64 is spaced above a line perpendicular to the pins 42 and the pins 56, and the initial movement of the shutter 54 in an opening direction moves the adjacent end of the link upwardly relative to and away from a line perpendicular to the pins 42 and 56. During this initial movement of shutter 54 the movement of link 68 is primarily pivotal movement about its connection to arm 44 and continued pivotal movement of shutter 54 produces bodily movement of link 68 producing accompanying opening movement of shutter 40.

In operation, when air pressure is applied to the inner side of shutter 54, as, for example, by a kitchen exhaust fan, not shown, the differential pressure, as pointed out above produces a pivotal movement of the shutter 54 in a clockwise direction. This movement immediately moves the pivotal connection of the link 68 and arm 66 upwardly as viewed in Figure 1, and from the over-toggle position and continued movement of shutter 54 moves the shutter 40, through the link 68, toward its open position. Upon turning off the fan or other means for applying air pressure to the inner or right hand surface of the shutter 54, as viewed in Figure 1, the force of gravity will return the shutters to the closed positions.

To limit movement beyond the open position, the lower portion 58 of the shutter 54 carries a bumper 74 mounted on its outer face which is disposed to engage the underside of the link 68. It will be appreciated, of course, that in the preferred embodiment illustrated movement beyond the closed position is prevented by the engagement of the shutters 40 and 54 with the sealing strips 52 and 62 respectively.

While only one specific embodiment of the invention has been illustrated and described in detail, it will be readily appreciated by those skilled in the art that numerous modifications and changes may be made without departing from the spirit and scope of the invention.

What is claimed is:

1. A shutter assembly for a ventilator conduit, said shutter assembly comprising supporting members adapted to be mounted on said conduit, a first shutter mounted on said supporting members and adapted to be pivoted between an open position and a closed position, a second shutter mounted on said supporting members and adapted for movement between an open position and a closed position, link means interconnecting said shutters for substantially simultaneous operation and adapted to assume a position upon movement of said shutters to said closed positions in which any force transmitted to said second shutter through said link means as the result of any attempt to pivot said first shutter in an opening direction has no lever arm effective to provide a moment tending to pivot said second shutter in an opening direction whereby said first shutter is securely held against pivotal movement while said second shutter is in said closed position, said second shutter being effective upon pivotal movement from its said closed position to move said link means from said position.

2. A shutter assembly for a ventilator conduit, said shutter assembly comprising supporting members adapted to be mounted on said conduit, a first shutter mounted on said supporting members and adapted to be pivoted between an open position and a closed position, a second shutter mounted on said supporting members and adapted for movement between an open position and a closed position, stop means engageable with one of said shutters for preventing movement thereof in one direction beyond said closed position thereof, link means interconnecting said shutters for substantially simultaneous operation and adapted to assume a position upon movement of said shutters to said closed positions in which any force transmitted to said second shutter through said link means as the result of any attempt to pivot said first shutter in an opening direction has no lever arm effective to provide a moment tending to pivot said second shutter in an opening direction whereby said first shutter is securely held against pivotal movement while said second shutter is in said closed position, said second shutter being effective upon pivotal movement from its said closed position to move said link means from said position.

3. A shutter assembly for a ventilator conduit, said shutter assembly comprising supporting members adapted to be mounted on said conduit, a first shutter, means mounting said shutter on said members for pivotal movement about a substantially horizontal axis between an open position and a closed position, a second shutter, means mounting said second shutter on said members for pivotal movement about a second substantially horizontal axis, link means interconnetcing said shutters for substantially simultaneous operation, said shutters, said means mounting said shutters and said link means being so constructed and arranged that when said shutter assembly is mounted in said conduit and said conduit is disposed in the position of use, the force of gravity urges said shutters toward their closed positions, said link means moving to a locking position as said shutters move to said closed positions, said link means being effective in said locking position to hold said first shutter against pivotal movement toward said open position until said link means is moved from said locking position, and said second shutter being effective upon pivotal movement thereof from its said closed position toward its said open position to move said link means from said locking position.

4. A shutter assembly as defined in claim 2 wherein each of said shutters is mounted for movement about an axis intermediate the opposite edges thereof, at least one of said axes being offset from the center of its respective shutter so that the larger of the shutter portions at the opposite sides of said one of said axes is raised by movement of said shutter from said closed position to said open position.

5. A ventilator conduit and shutter assembly comprising a conduit, a first shutter, a second shutter, means mounting said shutters on said conduit for movement respectively about substantially parallel axes individual thereto between open and closed positions, and link means interconnecting said shutters for substantially simultaneous movement and adapted to move to a locking position upon movement of said shutters to said closed positions, said link means being effective in said locking position to securely hold said first shutter against pivotal movement toward said open position, said second shutter being effective upon pivotal movement from its said closed position to its said open position, to move said link means from said locking position, and through said link means, to move said first shutter from said closed position to said open position.

6. A ventilator conduit and shutter assembly as defined in claim 5, including means preventing pivotal movement of said shutters beyond said closed positions.

7. A ventilator conduit and shutter assembly as defined in claim 5 including a plurality of sealing strips providing a seal between said shutters and said conduit when said shutters are in their closed positions and cooperating with said shutters and said conduit to prevent movement of said shutters beyond said closed positions.

8. A shutter assembly as defined in claim 1, wherein said link means includes arms individual to and fixed to said shutters, and a link pivotally connected to the outer ends of said arms.

9. A shutter assembly as defined in claim 1, wherein said link means includes arms individual to and fixed to said shutters, and a link pivotally connected to the outer ends of said arms and wherein upon movement of said shutters to said closed position the pivotal connection of said link to the arm fixed to said second shutter moves onto a line between the pivotal connection of said link to the other of said arms and the axis about which said second shutter is pivotally movable.

10. A ventilator conduit and shutter assembly comprising a conduit having an inlet opening and an outlet opening, a first shutter, a second shutter, means mounting said first shutter on said conduit intermediate said second shutter and said outlet opening for pivotal movement between an open position and a closed position, means mounting said second shutter on said conduit intermediate said first shutter and said inlet opening for pivotal movement between an open position and a closed position, said second shutter being pivotable about an axis offset from its center so that air forced into said inlet opening of said conduit will produce a resultant moment on said second shutter tending to pivot said shutter in an opening direction, link means which interconnects said shutters and is moved to a locking position upon movement of said shutters to said closed positions, said link means being effective when in said locking position to hold said first shutter against pivotal movement toward said open position, said second shutter being effective upon movement from said closed position to said open position to first move said link means from said locking position and through said link means to move said first shutter from said closed position to said open position, said ventilator conduit and shutter assembly being adapted to be so disposed when in use that said axis of said second shutter extends horizontally and is disposed above the center of said second shutter when said second shutter is in said closed position and the force of gravity opposes movement of said second shutter from said closed position to said open position.

References Cited in the file of this patent
UNITED STATES PATENTS

| Number | Name | Date |
|---|---|---|
| 1,373,960 | Forcier | Apr. 5, 1921 |
| 1,470,262 | Henriksen | Oct. 9, 1923 |
| 1,549,713 | Chaffey | Aug. 11, 1925 |
| 1,648,322 | Olson et al. | Nov. 8, 1927 |
| 1,696,922 | Nielsen | Jan. 1, 1929 |
| 1,907,727 | Breidert | May 9, 1933 |
| 2,159,498 | Birkholz | May 23, 1939 |
| 2,397,672 | Leigh | Apr. 2, 1946 |